United States Patent
Nakai et al.

(10) Patent No.: US 8,053,105 B2
(45) Date of Patent: Nov. 8, 2011

(54) LITHIUM-ION SECONDARY BATTERY

(75) Inventors: Kenji Nakai, Hitachinaka (JP); Akinori Tada, Hitachinaka (JP); Kinya Aota, Hitachi (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 836 days.

(21) Appl. No.: 12/057,329

(22) Filed: Mar. 27, 2008

(65) Prior Publication Data

US 2008/0292961 A1    Nov. 27, 2008

(30) Foreign Application Priority Data

May 22, 2007   (JP) ................................. 2007-135333

(51) Int. Cl.
*H01M 2/02* (2006.01)
(52) U.S. Cl. ........ 429/170; 429/131; 429/133; 429/136; 429/168; 429/163
(58) Field of Classification Search .................. None
See application file for complete search history.

(56) References Cited

U.S. PATENT DOCUMENTS

| 6,692,863 B1 * | 2/2004 | Nakanishi et al. ............. 429/94 |
| 2005/0277020 A1 | 12/2005 | Cheon et al. | |

FOREIGN PATENT DOCUMENTS

| CN | 1172400 C | 10/2004 |
| EP | 1 076 371 A1 | 2/2001 |
| EP | 1 102 337 A1 | 5/2001 |
| EP | 1 484 808 A1 | 12/2004 |
| EP | 1 734 599 A2 | 12/2006 |
| JP | 2001-283824 A | 10/2001 |
| JP | 2004-172038 A | 6/2004 |

OTHER PUBLICATIONS

Office Action issued by European Patent Office in corresponding European Patent Application No. 08 153 349.9. Office Action issued by Chinese Patent Office in corresponding Chinese Patent Application No. 2008100886290.
Communication from European Patent Office, dated Jan. 18, 2011, in corresponding European Patent Application No. 08 153 349.9.

* cited by examiner

*Primary Examiner* — Cynthia Lee
(74) *Attorney, Agent, or Firm* — Roberts Mlotkowski Safran & Cole, P.C.

(57) ABSTRACT

The present invention provides a lithium-ion secondary battery which can suppress internal resistance to a small value. The lithium-ion secondary battery includes a winding group obtained by winding a positive electrode plate and a negative electrode plate via a separator. An end portion of a positive electrode mixture non-application portion 1 projects at an upper portion of the winding group, while an end portion of a negative electrode mixture non-application portion projects at a lower portion of the winding group. Current collecting disks 7 are disposed on both end faces of the winding group so as to face them, respectively, and materials for the current collecting disks are the same materials as those for a positive electrode current collector and a negative electrode current collector. An end portion of the positive electrode mixture non-application portion 1 is joined to a face of the current collecting disk 7 positioned on the side of the winding group at a plurality of joint portions on the positive electrode side, while an end portion of the negative electrode mixture non-application portion is joined to a face of the current collecting disk 7 positioned on the side of the winding group at a plurality of joint portions on the negative electrode side. Some of the joint portions form joint portions taking on a width expansion shape gradually expanding from a joint end portion with the positive electrode mixture non-application portion 1 toward the current collecting disk 7. A volume of the joint portion 25 is increased.

8 Claims, 5 Drawing Sheets

LITHIUM-ION SECONDARY BATTERY

FIELD OF THE INVENTION

The present invention relates to a lithium-ion secondary battery, and in particular to a lithium-ion secondary battery including an electrode body where a positive electrode plate obtained by applying positive electrode mixture mainly including positive electrode active material to a current collector and a negative electrode plate obtained by applying negative electrode mixture mainly including negative electrode active material to a current collector are disposed so as to sandwich a separator.

DESCRIPTION OF THE RELATED ART

As a lithium-ion secondary battery representing a lithium secondary battery has high capacity and high energy density, it draws attention as a power source for an electric vehicle or a hybrid vehicle addressing an environmental problem or a battery for an electric power tool. Since the electric vehicle is required to have a high acceleration performance, a high hill-climbing performance, and the like, a lithium-ion secondary battery with a high-rate orientation coping with large current charging/discharging is required as a battery for a power source for the vehicle. In such a battery with a high-rate orientation, it is important to reduce an internal resistance in order to improve output performance.

In the lithium-ion battery, generally, positive and negative electrode plates are obtained by applying mixtures containing active material to respective current collectors and electrons generated due to reaction of the active material are collected from the current collector to a current collecting member to be taken out of the battery. As the current collector, a foil, a film, or perforated plate made from metal having electrical conductivity or the like is used. In order to collect electrons from the current collector to the current collecting member, a technique of working an end portion of the current collector to a strip comb shape to connect the same to the current collecting member or a technique of connecting the current collector and the current collecting member to each other using current collecting tabs attached to the current collector is adopted. For example, a technique of attaching a plurality of current collecting tabs to a current collector to connect end portions of the current collecting tabs to a terminal collectively has been disclosed (for example, see JP-A-2001-283824).

However, the technique of performing working for formation of a strip comb shape to a current collector or the technique of attaching current colleting tabs to a current collector requires much time for the working or the attaching, which results in lowering of a manufacturing efficiency at an industrial mass production time. Since working for formation of a strip comb shape is performed, such a problem arises that a portion of the current collector to be discarded increases, which results in lowering of material yield. When an electrode body is manufactured by winding positive and negative electrode plates via a separator using such a current collector, strip comb shaped end portions or current collecting tabs are expanded radially due to a rotation centrifugal force at a winding time so that the current collecting tabs or the like may bite the electrode body. As a result, insulation between the positive and negative electrodes is damaged to cause short-circuiting, which results in so-called process defect. Further, the current collecting tabs or the like is bent so as to cover an end face of the electrode body to be connected to a side edge of the current collecting member, which results in prevention of circulation of electrolyte. As a result, a time required for electrolyte pouring is prolonged (preparing lead time increases), which results in a factor leading to increase of manufacturing cost. In order to solve these problems, a technique of forming projecting ridge portions on both faces of a current collecting member to bring the projecting ridge portion on one face of the current collecting member in contact with an end edge of a current collector disposed in a layered manner and irradiating the projecting ridge portion on the other face of the current collecting member with energy rays to weld the current collecting member and the current collector to each other has been disclosed (for example, see JP-A-2004-172038).

In the technique disclosed in JP-A-2004-172038, however, since the working for formation of a strip comb shape or the current collecting tab is not required, the problem with a time required for the abovementioned working does not occur, but since the projecting ridge portions are formed on both faces of the current collecting member, a melted portion formed by welding becomes excessively large. Reduction of an internal resistance is expected owing to increase of a volume of a joined portion between the current collector and the current collecting member, but since a melted portion is formed even on a portion where the current collector do not come in contact with the current collecting member, welding of an excessive volume portion is forced, which results in increase of manufacturing cost. Since the melted portion is increased, damage of the separator or short-circuiting between the positive electrode and the negative electrode may be caused. Since there is a possibility that influence of increase of an internal resistance, lowering of reliability, or the like increases according to a current collecting structure or the situation of a current collecting portion, it is important to secure high performance quality or reliability while considering industrial mass production, especially, in a lithium-ion secondary battery with a high-rate orientation.

SUMMARY OF THE INVENTION

In view of these circumstances, an object of the present invention is to provide a lithium-ion secondary battery which can suppress internal resistance to a low level.

In order to solve the above problem, according to an aspect of the present invention, there is provided a lithium-ion secondary battery provided with an electrode body where a positive electrode plate obtained by applying positive electrode mixture mainly including a positive electrode active material to a current collector and a negative electrode plate obtained by applying negative electrode mixture mainly including negative electrode active material to a current collector are disposed so as to sandwich a separator, wherein at least one of the current collectors of the positive electrode plate and the negative electrode plate is disposed such that an end portion of said at least one projects from an end face of the electrode body, an end portion of each current collector is joined to a face of a current collecting member positioned on the side of the electrode body at a plurality of joint portions, the current collecting member being made from the same material as the current collector and being disposed so as to face the end face of the electrode body, and at least some of the joint portions take on a width-expanded shape gradually expanding from a joint end portion with the current collector to the current collecting member.

In the aspect of the present invention, the projecting end portion of at least one of the current collectors of the positive electrode plate and the negative electrode plate is joined to the face of the current collecting member made from the same material as the current collector, which is positioned on the side of the electrode body, at the plurality of joint portions, and at least some of the joint portions take on an width-expanded shape gradually expanding from an joint end portion with the current collector to the current collecting member, so that a volume is increased at a portion with the width-expanded shape, which can result suppression of internal resistance.

In the present invention, it is preferable that a ratio the number of joint portions taking on a width-expanded shape to the whole number of joint portions is 80% or more. Such a configuration can be adopted that the joint portions are disposed on a face of the current collecting member positioned on the electrode body in a manner of a plurality of curves or in a linear manner, and the current collecting member has a projecting ridge portion provided between adjacent joint portions of the joint portions disposed positioned on the side of the electrode body. At this time, when a distal end of the projecting ridge portion is positioned nearer to the side of the current collecting member than an expansion starting position of the joint portion taking on a width-expanded shape, formation of the joint portion formed in a width-expanded shape is made easy. When the expansion starting portion of the joint portion taking on a width-expanded shape is positioned nearer to the side of the current collecting member than a position of an end edge of the separator, damage of the separator can be prevented when the current collector and the current collecting member are jointed. The joint end portion of the joint portion taking on a width-expanded shape with the current collecting body may be formed to be acute. The current collector whose end portion projects from the end face of the electrode body is formed on one side edge with a non-application portion of the positive electrode mixture or the negative electrode mixture, and when a portion or a whole of the non-application portion is protruded from an end edge of the separator and a protruded end portion of the non-application portion is protruded from the end face of the electrode body, joining of the end portion of the current collector and the current collecting member can be made easy. It is preferable that some of the joint portions are formed in such a width-expanded shape as to linearly and gradually expand from a joint end portion with the current collector toward the current collecting member.

According to the present invention, since a protruded end portion of at least one of the current collectors of the positive electrode plate and the negative electrode plate is joined to a face of the current collecting member made from the same material as the current collector, which is positioned on the side of the electrode body, at a plurality of joint portions and at least some of the joint portions take on a width-expanded shape as to gradually expand from a joint end portion with the current collector toward the current collecting member, such an effect can be achieved that internal resistance is suppressed to a small value.

DETAILED DESCRIPTION OF THE PREFERRED EMBODIMENTS

Embodiments of a cylindrical lithium-ion secondary battery to which the present invention has been applied will be explained below with reference to the drawings.

(Configuration)

Figure 1:
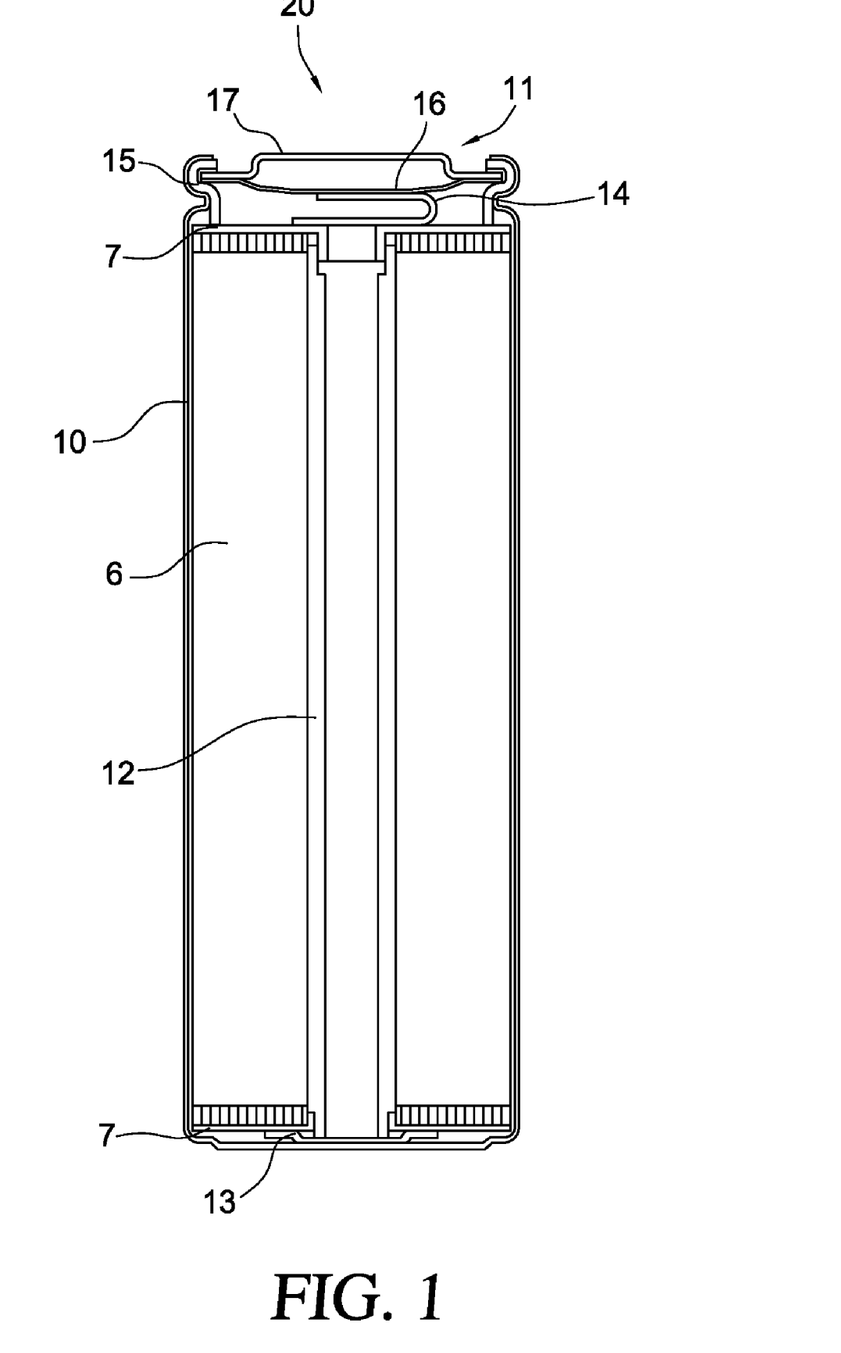
FIG. 1 is a sectional view schematically showing a cylindrical lithium-ion secondary battery according to an embodiment to which the present invention has been applied.

As shown in FIG. 1, a cylindrical lithium-ion secondary battery 20 according to the embodiment includes a winding group 6 serving as an electrode body obtained by winding a positive electrode plate and a negative electrode plate in a spiral shape in section such that these plates face each other via a separator. The winding group 6 is accommodated in a battery container 10 formed with an opening portion at its top portion.

Figure 4:
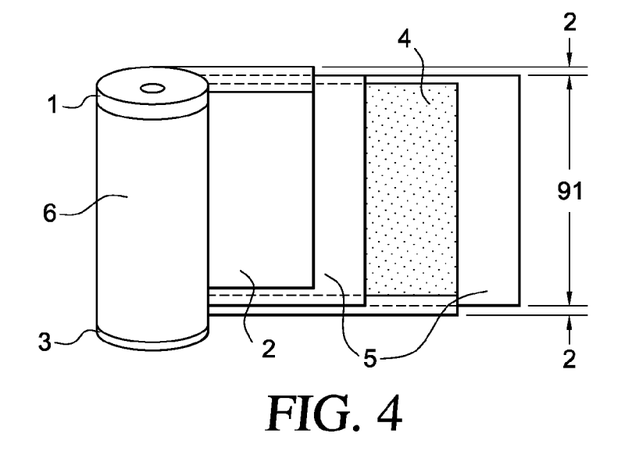
FIG. 4 is an explanatory diagram illustratively showing a positional relationship among the positive electrode plate, the negative electrode plate, and a separator configuring a winding group of the cylindrical lithium-ion secondary battery.

A cylindrical shaft core 12 made from polypropylene is positioned at a winding center of the winding group 6. As shown in FIG. 4, in the winding group 6, a positive electrode plate 2 and a negative electrode plate 4 are superimposed on each other via a separator 5 made from polypropylene or the like and they are wound around the shaft core 12 such that they does not directly contact with each other. The separator 5 is set such that its thickness is 30 μm and its width (a length in a longitudinal direction of the shaft core 12) is 91 mm in this embodiment. The positive electrode plate 2, the negative electrode plate 4, and the separator are superimposed such that a positive electrode mixture non-application portion 1 (a portion of a current collector) formed on the positive electrode plate 4 and a negative electrode mixture non-application portion 3 (a portion of a current collector) are positioned on both end faces of the winding group 6 opposed to each other. The positive electrode mixture non-application portion 1 and the negative electrode mixture non-application portion 3 are disposed at positions running over the separator 5 by 2 mm. That is, an aluminum foil of a positive electrode current collecting body configuring the positive electrode plate 2 projects at an upper portion of the winding group 6 and a rolled copper foil of a negative electrode current collecting body configuring the negative electrode plate 4 projects at a lower portion of the winding group 6.

In the winding group 6 obtained by winding the positive electrode plate 2, the negative electrode plate 4, and the separator 5, one portions or whole portions of the positive electrode mixture non-application portion 1 and the negative electrode mixture non-application portion 3 which run over the separator 5, respectively, project from end edges of the separator 5, so that the projecting ends project from both end faces of the winding group 6, respectively. By adjusting lengths of the positive electrode plate 2, the negative electrode plate 4, and the separator 5, an outer diameter (as a diameter) of the winding group 6 is adjusted to 38±0.1 mm. An inter diameter (as a diameter) of the winding group 6 becomes equal to an outer diameter of the shaft core 12. An adhesive tape obtained by applying adhesive made from hexameta-acrylate or the like on one face of a base member made from polyimide is applied to a whole peripheral face of the winding group 6 such that the winding group 6 does not uncoil, and a terminal end portion of winding of the winding group 6 is fixed. In the winding group 6, both of the positive electrode plate 2 and the negative electrode plate 4 are wound in a layer shape by 50 windings, namely, a winding body with 50 layers is formed.

As shown in FIG. 1, a current collecting disk 7 made from aluminum and serving as a current collecting member for collecting potential from the positive electrode plate is disposed at an upper side of the winding group 6, while a current collecting disk 7 made from copper and collecting potential from the negative electrode plate is disposed at a lower side of the winding group 6. That is, the current collecting disks 7 are disposed such that they face both end faces of the winding group 6, and the same materials as the positive electrode current collecting body and the negative electrode current collecting body are respectively used as materials for the respective current collecting disks 7. Both the current collecting disks 7 on the positive side and the negative side are formed to have the same shape.

Figure 5:
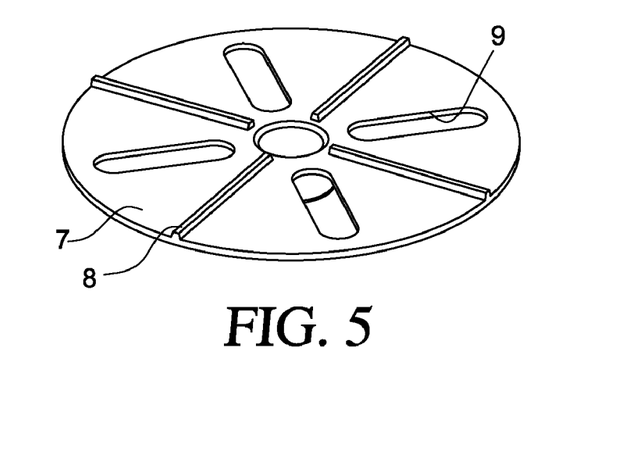
FIG. 5 is a perspective view of a current collecting disk used in the cylindrical lithium-ion secondary battery.
Figure 6A:
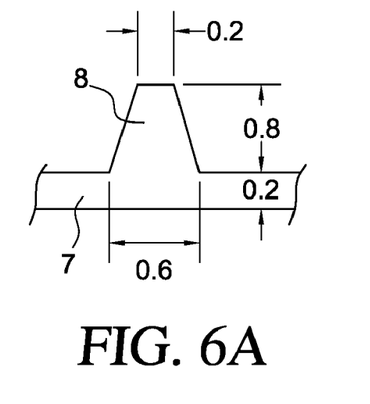
FIGS. 6A and 6B are sectional views of projecting ridge portions formed on the current collecting disk, FIG. 6A corresponding to a projecting ridge portion of the current collecting disk used in Example 1 to Example 5, and Example 7, while FIG. 6B corresponding to a projecting ridge portion of the current collecting disk used in Example 6.
Figure 7A:
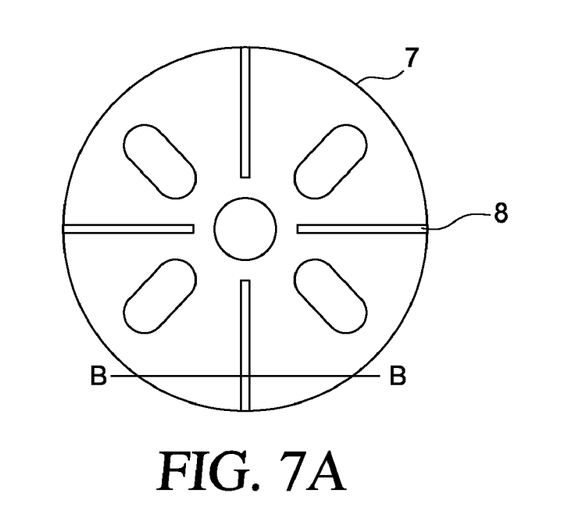
FIGS. 7A and 7B show a shape of a welded portion when a projecting ridge portion of a current collecting disk is laser-welded, FIG. 7A being a plan view of the current collecting disk before welding and FIG. 7B being a sectional view of the current collecting disk after welding, taken along line B-B in FIG. 7A.

As shown in FIG. 5 and FIG. 7A, the current collecting disk 7 is set such that its diameter is 38.5 mm and its thickness is 0.2 mm in this embodiment. A cylindrical projecting portion for fixation to the shaft core 12 on the winding group 6 side is formed at a central portion of the current collecting disk 7 (also see FIG. 1). The current collecting disk 7 has projecting ridge portions 8 with a trapezoid in section on one face side and portions corresponding to the projecting ridge portions 8 on the other face side are formed to have flat faces. The projecting ridge portions 8 are formed at four positions on the current collecting disk 7 so as to extend along radial directions of the current collecting disk 7. As shown in FIG. 6A, a size of each projecting ridge portion 8 is set such that a width of an upper base is 0.2 mm, a width of a lower base is 0.6 mm, and a height is 0.8 mm, while a thickness of the current collecting disk 7 is 0.2 mm. A length of the projecting ridge portion 8 (a length in a radial direction of the current collecting disk 7) is set so as to correspond to a range from a center side position to an outer peripheral side position of an aluminum foil (the rolled copper foil projecting at the lower portion of the winding group 6 on the negative electrode side) projecting at the upper side of the winding group 6. That is, the projecting ridge portion 8 is formed so as to correspond to a position or range from an innermost periphery (except for the shaft core 12) up to an outermost periphery of the winding group 6.

A plurality of slits 9 serving as flow passages for nonaqueous electrolyte at a pouring time of nonaqueous electrolyte in a battery manufacturing process is formed in portions of the current collecting disk 7 which do not have the projecting ridge portions 8, namely, fan-shaped portions between the projecting ridge portions 8 adjacent to each other. The slits 9, each being ovalized so as to extend in a radial direction of the current collecting disk 7, are formed at four portions on the current collecting disk 7.

As shown in FIG. 1, the current collecting disks 7 are fixed to an upper end portion and a lower end portion of the shaft cores 12 at the cylindrical projecting portions formed at the central portions of the current collecting disks 7. On the positive electrode side, an end portion of the positive electrode mixture non-application portion 1 (aluminum foil) projecting at the upper portion of the winding group 6 is joined to the lower face of the current collecting disk 7 at a plurality of joint portions by laser welding. On the other hand, on the negative electrode side, an end portion of the negative electrode mixture non-application portion 3 (rolled copper foil) projecting at the lower portion of the winding group 6 is joined to the lower face of the current collecting disk 7 at a plurality of joint portions by laser welding. Since shapes of the joining portion on both the positive electrode side and the negative electrode side are formed in the same manner, only the joining portions only on the positive electrode side are explained for simplification of explanation.

Figures 9, 10, 11:
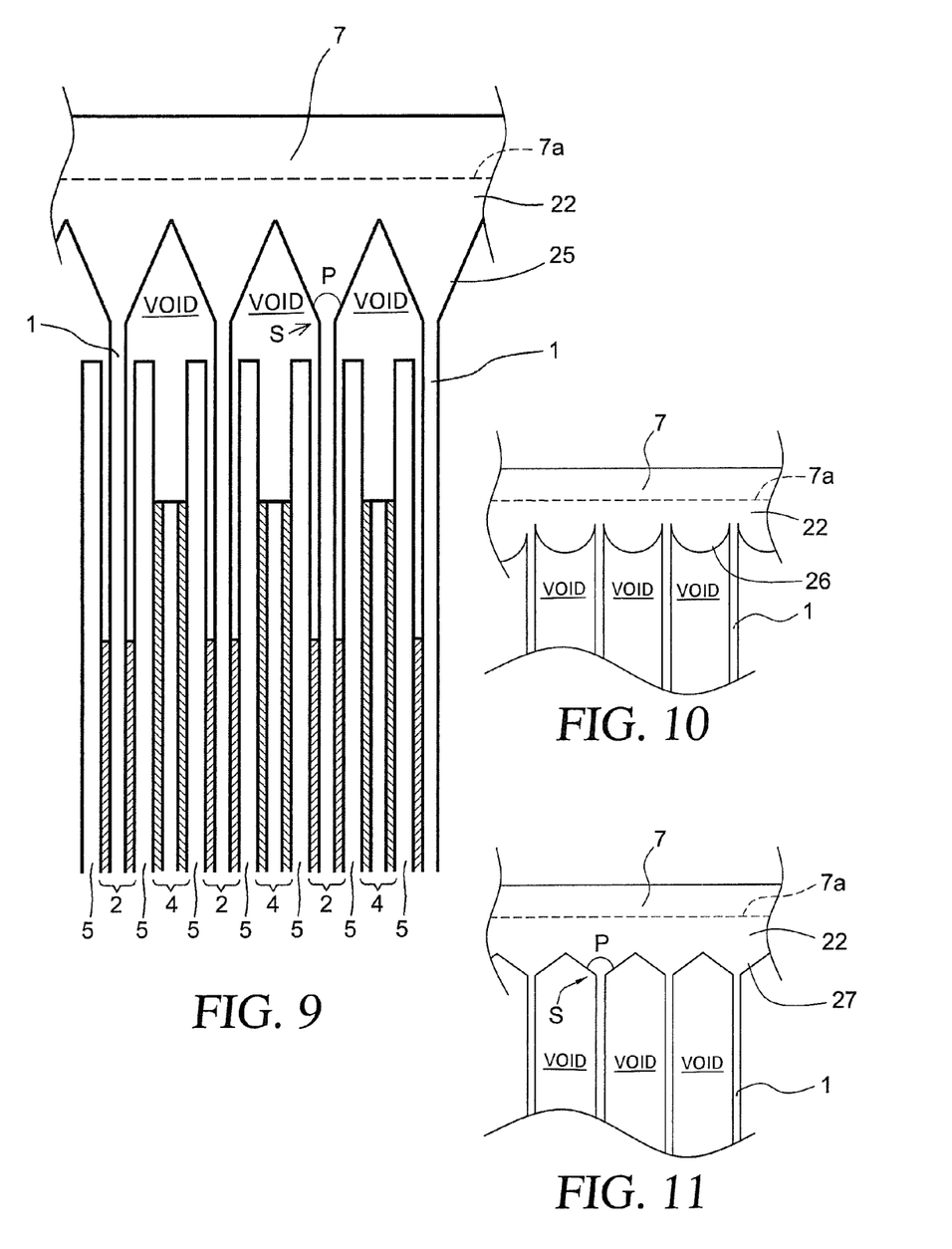
FIG. 9 is a sectional view illustratively showing acute-angled joint portions formed between void portions in an approximately cone shape at a joint portion between a current collecting disk and an end portion of a positive electrode mixture non-application portion in the cylindrical lithium-ion secondary battery.
FIG. 10 is a sectional view illustratively showing a joint portions formed between void portions so as not to have expansion at the joint portions between a current collecting disk and an end portion of a positive electrode mixture non-application portion in the cylindrical lithium-ion secondary battery.
FIG. 11 is a sectional view illustratively showing a joint portions between void portions with an acute angle formed in an approximately cone shape at the joint portions between a current collecting disk and an end portion of a cathode mixture non-application portion in the cylindrical lithium-ion secondary battery.

As shown in FIG. 9, the joining portions between the end portion of the positive electrode mixture non-application portion 1 projecting at the upper portion of the winding group 6 and the current collecting disk 7 are formed so as to correspond to positions of the projecting ridge portions 8, and the joining portions are arranged in a plurality of straight shapes, namely, four radial linear shapes on the lower face (a face on the winding group 6 side) of the current collecting disk 7. At least some of the joining portions, namely, 80% or more of the total number of joining portions form joint portions 25 taking on a width-expanded shape gradually expanding from a joint end portion with the positive electrode mixture non-application portion 1 toward the current collecting disk 7 linearly. A expansion starting position S of the joint portion 25 expanding in a fan shape, namely, a joint end with the positive electrode mixture non-application portion 1 is positioned above (the current collecting disk 7 side) an end edge of the separator 5 configuring the winding group 6. An expanding angle P of the joint portion 25 at the expansion starting position S is formed to have an acute angle. In other word, the joint portion 25 is formed to have an acute angle at the joint end portion with the positive electrode mixture non-application portion 1.

A projecting portion (with a semicircular shape in section) where a sectional shape in a direction along a surface of the positive electrode mixture non-application portion 1 is rounded downwardly (the winding group 6 side) is formed on a lower face of the current collecting disk 7 between adjacent joint portions joined with the positive electrode mixture non-application portion 1 (which does not include aluminum foil). A distal end of the projecting portion is positioned above the expansion starting position S of the joint portion 25 (the current collecting disk 7 side).

At a laser welding time, the projecting ridge portion 8 formed on the current collecting disk 7 melts and one portion of the current collecting disk 7 melts so that a melt portion grows down from a lower face 7a of the current collecting disk 7 and a projecting portion with a semicircular shape in section is formed. Further, a portion of the positive electrode mixture non-application portion 1 abutting on the current collecting disk 7 grows down such that the melted portion growing down from the lower face 7a wets both faces of the end portion of the positive electrode mixture non-application portion 1, and the end portion of the positive electrode mixture non-application portion 1 is melted into the melted portion to be integrated thereto, so that a joint portion 25 with an expanded width is formed below the projecting portion with a semicircular shape in section. Therefore, the projecting portion with a semicircular shape is included in the joint portion 25. Before the current collecting disk 7 and the positive electrode mixture non-application portion 1 are joined to each other, the end edge of the positive electrode mixture non-application portion 1 abuts on the lower face 7a of the current collecting disk 7, but after they are joined by welding, an original end portion of the positive electrode mixture non-application portion 1 is integrated into the joint portion 25, so that the expansion starting position S on the joint portion 25 configures an end of the positive electrode mixture non-application portion 1.

A disk-like upper lid 11 which also serves as a positive electrode external terminal is disposed above the current collecting disk 7 on the positive electrode side. One end of a positive electrode lead 14 made from aluminum and having a thickness of 0.3 mm and a width of 16 mm is welded to a central portion upper face of the current collecting disk 7. The other end of the positive electrode lead 14 and a lower face of a disk 16 configuring the upper lid 11 are joined to each other by laser welding. On the other hand, a disk-like negative electrode lead 13 with a thickness of 0.5 mm which is made from nickel and whose central portion projects on the side opposite to the winding group 6 is disposed below the current collecting disk 7 on the negative electrode side. An outer peripheral portion upper face of the negative electrode lead 13 is joined to the lower face of the current collecting disk 7 by ultrasonic welding. A central portion lower face of the negative electrode lead 13 is joined to an inner bottom face of the battery container 10 which also serves as a negative electrode external portion terminal by resistance welding. A cylindrical container with a bottom made from iron and nickel-plated is used as the battery container 10, and a thickness of the container is set to 0.5 mm in this embodiment. Incidentally, the battery container 10 is irradiated with laser beam from the outside of the bottom face, so that the number of welded portions between the negative electrode lead 13 and the battery container 10 is increased.

Figure 8:
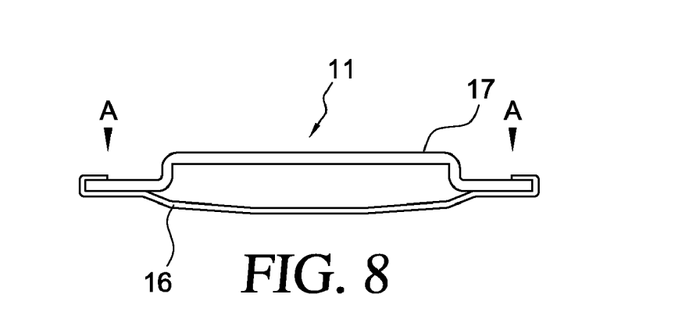
FIG. 8 is a sectional view of an upper lid configuring the cylindrical lithium-ion secondary battery.

As shown in FIG. 8, the upper lid 11 comprises a cap 17 made from aluminum and a disk 16 made from aluminum. A central portion of the cap 17 projects to the side opposite to the winding group 6 (the outside of the battery), and a thickness of the cap 17 is set to 1 mm in the embodiment. The disk 16 is formed so as to cover the opening portion of the battery container 10 and it takes on such a dish shape that its central portion projects toward the winding group 6. An entire outer peripheral portion of the disk 16 is folded back to the upper face side of an outer peripheral portion of the cap 17. Laser welding is applied to the whole circumference of the outer peripheral portion from the folded-back upper face side toward the folded-back portion (in a direction of black arrow A in FIG. 8).

As shown in FIG. 1, the upper lid 11 is fixed to the upper opening portion of the battery container 10 via a gasket 15 made of polypropylene in a crimping manner. Therefore, the battery container 10 is enclosed and sealed by the upper lid 11. Nonaqueous electrolyte is poured into the battery container 10. As the nonaqueous electrolyte, solution obtained by dissolving 6-lithium hexafluorophosphate (LiPF) into mixed solution including ethylene carbonate and dimethyl carbonate at a volume ratio of 2:3 at 1 mol/litter is used.

Figure 2:
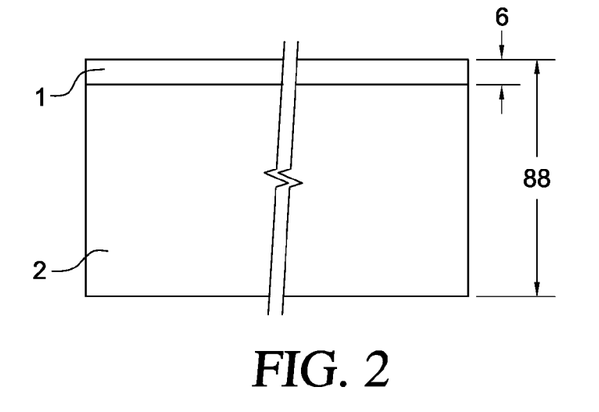
FIG. 2 is a plan view illustratively showing a positive electrode plate configuring the cylindrical lithium-ion secondary battery according to the embodiment.

As shown in FIG. 2, the positive electrode plate 2 configuring the winding group 6 has an aluminum foil as a positive electrode current collector. A thickness of the aluminum foil is set to 20 μm in this embodiment. Positive electrode mixture containing positive electrode active material is approximately evenly applied to both faces of the aluminum foil. As the active electrode active material, for example, powder of lithium transition metal double oxide such as lithium manganate expressed by chemical formula $LiMn_2O_4$ is used. The positive electrode mixture is obtained by blending positive electrode active material, graphite powder serving as primary conductive material, acetylene black serving as secondary conductive material, and polyvinylidene-fluoride (hereinafter, abbreviated "PVDF") serving as binder, for example, at a mass ratio of 85:8:2:5. Slurry is prepared by adjusting the viscosity of the positive electrode mixture using disperse medium such as N-methyl-2-pyrolidone (hereinafter, abbreviated "NMP") at an application time of the positive electrode mixture to the aluminum foil. After dried, the positive electrode plate 2 is pressed to be formed in a strip with a width of 88 mm. A positive electrode mixture non-application portion 1 with a width of 6 mm is formed on a side edge of the aluminum foil in a longitudinal direction thereof.

Figure 3:
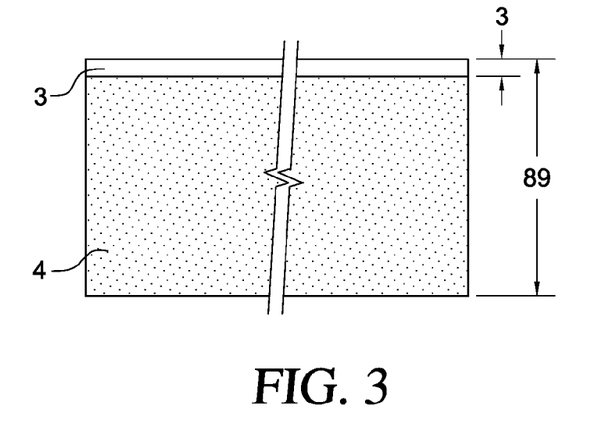
FIG. 3 is a plan view illustratively showing a negative electrode plate configuring the cylindrical lithium-ion secondary battery according to the embodiment.

On the other hand, as shown in FIG. 3, the negative electrode plate 4 has a rolled copper foil as the positive electrode current collector. A thickness of the rolled copper foil is set to 20 μm in this embodiment. Negative electrode mixture including powder of carbon material such as easily graphitizable carbon which can store and discharge lithium ion reversibly as the negative electrode active material is evenly applied to both face of the rolled copper foil. The negative electrode mixture is prepared by blending PVDF of 8 mass parts to easily graphitizable carbon powder of 92 mass parts. Slurry is prepared by adjusting the viscosity of the negative electrode mixture using disperse medium such as NMP at an application time of the negative electrode mixture to the rolled copper foil. After dried, the negative electrode plate 4 is pressed to be formed in a strip with a width of 89 mm. A negative electrode mixture non-application portion 3 with a width of 3 mm is formed on a side edge of the rolled copper foil in a longitudinal direction thereof like the positive electrode plate 2. Incidentally, an application amount of the negative electrode active material to the rolled copper foil is adjusted such that a ratio of an amount of lithium ion discharged from the positive electrode plate 2 at an initial charging time to an amount of lithium ion stored in the negative electrode plate 4 at the initial charging time is 1:1.

(Assembling of Battery)

The lithium-ion secondary battery 20 is assembled in the following manner. First, the current collecting disk 7 is placed on an upper end face of the winding group 6, and a flat portion of the other face (a face on which the projecting ridge portion 8 is not formed) of the current collecting disk 7 is caused to abut on an end portion of the positive electrode mixture non-application portion 1 positioned on the upper end face of the winding group 6. The projecting ridge portions 8 are irradiated with laser beam from above the projecting ridge portions 8 (above the current collecting disk 7) along the projecting ridge portions 8. The projecting ridge portions 8 and a portion of the current collecting disk 7 are melted by irradiation of laser beam so that a back face (the lower face of the current collecting disk 7) of a laser-irradiated face and end portions of the positive electrode mixture non-application portion 1 of respective windings (50 layers) abutting on the back face are joined. That is, when the projecting ridge portions 8 and the portion of the current collecting disk 7 are melted, a melted portion grows down from a lower face of the current collecting disk 7 due to gravity so that a projecting portion is formed. The projecting portion forms a welding locus due to irradiation of laser beam. After irradiation of laser beam, the projecting portion remains as a melt trail and portions where the projecting ridge portions 8 are formed becomes approximately flat. Regarding four projecting ridge portions 8, they are sequentially irradiated with laser beam from upper face of the projecting ridge portions 8 so that an end portion of the positive electrode mixture non-application portion 1 abutting on the lower face of the current collecting disk 7 is welded. Next, the end portion of the negative electrode mixture non-application portion 3 and the current collecting disk 7 are welded to each other like welding between the positive electrode mixture non-application portion 1 and the current collecting disk 7. At this time, welding is performed by reversing the winding group 6 welded with the current collecting disk 7 on the positive electrode side vertically and positioning the negative electrode mixture non-application portion 3 to the upper side.

Figure 7B:
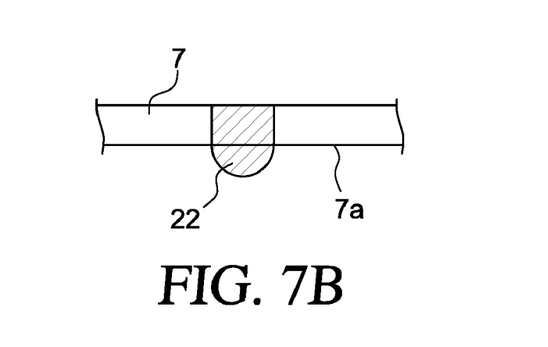

Here, laser welding will be explained. As shown in FIG. 7B, when the projecting ridge portion 8 formed on the current collecting disk 7 is irradiated with laser beam from above the projecting ridge portion 8, the projecting ridge portion 8 and a portion of the current collecting disk 7 melt and a melted portion grows down from the lower face of the current collecting disk 7 so that a projecting portion 22 with a semicircular shape in section is formed. The projecting portion 22 is formed corresponding to the projecting ridge portion 8 so that the projecting portion 22 enters between the positive electrode mixture non-application portions 1 of the winding group 6 (similarly applied to between the negative electrode mixture non-application portions 3). After laser beam irradiation, the projecting portion 22 formed due to growing-down of the melted portion is cooled and solidified so that melt trail remains. Therefore, the end portions of the positive electrode mixture non-application portions 1 (the end portions of the negative electrode mixture non-application portions 3) are joined to the current collecting disk 7. At this time, a position of the upper base face of the projecting ridge portion 8 lowers down to an upper face of the current collecting disk 7 to become approximately flat.

Next, the negative electrode lead 13 is attached to a face of the current collecting disk 7 on the negative electrode side opposite to the winding group 6 by ultrasonic wave welding. The winding group 6 attached with the negative electrode lead 13 is accommodated in the battery container 10 such that the negative electrode lead 13 is positioned on the bottom face side of the battery container 10. A lower face of the negative electrode lead 13 and the inner bottom face of the battery container 10 are joined to each other by resistance welding. After joint, a bottom face of the battery container 10 is irradiated with laser beam from the outside of the bottom face so that the number of welded portions between the negative electrode lead 13 and the battery container 10 is increased.

One end of the positive electrode lead 14 is then joined to an upper face of the current collecting disk 7 on the positive electrode side by welding, while an the other end thereof is joined to a lower face of the disk 16 configuring the upper lid 11 by welding. Next, nonaqueous electrolyte is poured into the battery container 10. A pouring amount of nonaqueous electrolyte is set to 50 g in this embodiment. After pouring the nonaqueous electrolyte, the upper lid 11 is fixed to the upper portion of the battery container 10 through the gasket 15 in a crimping manner to enclose and seal the battery container 10, thereby completing the lithium-ion secondary battery 20.

EXAMPLES

Next, Examples of the lithium-ion secondary battery 20 manufactured according to the embodiment will be explained.

Example 1

In Example 1, when an end portion of a positive electrode mixture non-application portion 1 and an end portion of a negative electrode mixture non-application portion 3 were joined to current collecting disks 7 on a positive electrode side and a negative electrode side by laser welding, respectively, just focus was applied to an upper base face of a projecting ridge portion 8, and a feeding rate at welding on the positive electrode side was set to 5 m/minute, while a feeding rate at welding on the negative electrode side was set to 4 m/minute. Irradiation output of laser at welding on the positive electrode was set to 650 W, while irradiation output of laser at welding on the negative electrode was set to 600 W.

Winding groups 6 obtained were sampled arbitrarily and they were cut in a direction along a welding locus, namely, in a direction along the projecting portion 22 and in a section direction of an aluminum foil, and joint portions were observed. Statuses of the joint portions were slightly different from one another to such an extent that differences among all Examples described later could not be recognized but they were substantially the same on both the positive electrode side and the negative electrode side. As shown in FIG. 9, the joint portion 25 was welded in a width-expanded shape gradually expanding from a joint end portion of the positive electrode mixture non-application portion 1 toward the current collecting disk 7. Regarding one welding locus (one of four radial straight portions), such a status was observed on 35 layers on an average to 50 layers which is the total number of joint portions of the positive electrode mixture non-application portion 1. From such a fact, it was found that a percentage of the number of the joint portions 25 to the total number of joint portions was 70%. The expansion angle P at the expansion starting position S was an acute angle and the joint portion 25 took on an acute shape. The projecting portion 22 was formed on the lower face of the current collecting disk 7 between adjacent joint portions 25. A distal end position of the projecting portion 22 was positioned nearer the current collecting disk 7 side than the expansion starting position S.

As shown in FIG. 10, regarding 15 layers other than the 35 layers formed with the joint portion 25, a joint portion 26 which did not have a shape gradually expanding from the thickness of the positive electrode mixture non-application portion 1 was formed. In other words, welding for width expansion was not performed regarding 15 layers on an average to 50 layers which is the total number. A percentage of the number of joint portions 26 to the total number of joint portions was 30%.

Regarding 10 lithium-ion secondary batteries arbitrarily selected from the lithium-ion secondary batteries 20 obtained, AC impedance was measured. In measurement of AC impedance, after a lithium-ion secondary battery 20 was charged up to 4.0V at the room temperature using 2 A constant current, it was then charged at 4.0V constant voltage until the current decreased to 0.1 A, and AC impedance of 1 khz together with an ambient environment temperature and a battery temperature was measured under condition of 25±0.5° C. (similarly conducted to the remaining examples). In the lithium-ion secondary battery 20 in Example 1, the AC impedance was 2.47 mΩ on an average.

Example 2

Example 2 was similar to Example 1 except that an irradiation output at a laser welding time was 700 W at welding on the positive electrode side while that was 630 W at welding on the negative electrode side in Example 2. Regarding one welding locus, a status of formation of the joint portions 25 was observed on 40 layers on an average to 50 layers which was the total number of the joint portions, which was 80% to the total number of joint portions. The expansion angle P at the expansion starting position S was an acute angle. A projecting portion 22 was formed between adjacent joint portions 25, and a distal end position of the projecting portion 22 was positioned nearer the current collecting disk 7 side than the expansion starting position S. The number of portions where the joint portion 26 was formed was 10 layers/50 layers on an average, which was 20% to the total number of joint portions. Regarding 10 lithium-ion secondary batteries arbitrarily selected from the lithium-ion secondary batteries 20 in Example 2, AC impedance measured was 2.07 mΩ on an average.

Example 3

Example 3 was similar to Example 1 except that an irradiation output at a laser welding time was 750 W at welding on the positive electrode side while that was 650 W at welding on the negative electrode side in Example 3. Regarding one welding locus, a status of formation of the joint portions 25 was observed on 46 layers on an average to 50 layers which was the total number of the joint portions, which was 92% to the total number of joint portions. The expansion angle P at the expansion starting position S was an acute angle. A projecting portion 22 was formed between adjacent joint portions 25, and a distal end position of the projecting portion 22 was positioned nearer the current collecting disk 7 side than the expansion starting position S. The number of portions where the joint portion 26 was formed was 4 layers/50 layers on an average, which was 8% to the total number of joint portions. Regarding 10 lithium-ion secondary batteries arbitrarily selected from the lithium-ion secondary batteries 20 in Example 3, AC impedance measured was 2.00 mΩ on an average.

Example 4

Example 4 was similar to Example 1 except that an irradiation output at a laser welding time was 900 W at welding on the positive electrode side while that was 750 W at welding on the negative electrode side in Example 4. Regarding one welding locus, a status of formation of the joint portions 25 was observed on 38 layers on an average to 50 layers which was the total number of the joint portions, which was 76% to the total number of joint portions. The expansion angle P at the expansion starting position S was an acute angle. A projecting portion 22 was formed between adjacent joint portions 25, and a distal end position of the projecting portion 22 was positioned nearer the current collecting disk 7 side than the expansion starting position S. The number of portions where the joint portion 26 was formed was 4 layers/50 layers on an average, which was 8% to the total number of joint portions. Regarding the remaining 8 layers of 50 layers, meltdown of the positive electrode mixture non-application portion 1 or the negative electrode mixture non-application portion 3 was observed. Regarding 10 lithium-ion secondary batteries arbitrarily selected from the lithium-ion secondary batteries 20, AC impedance measured was 2.38 mΩ.

Example 5

Example 5 was similar to Example 1 except that an irradiation output at a laser welding time was 550 W at welding on the positive electrode side while that was 500 W at welding on the negative electrode side in Example 5. Sectional shapes of the joint portions along the welding locus on both the positive electrode side and the negative electrode side took on a shape gradually expanding from a joint end portion with the positive electrode mixture non-application portion 1 (the negative electrode mixture non-application portion 3) toward the current collecting disk 7. As shown in FIG. 8, the joint portion 27 is formed in a width-expansion shape and an expansion angle P at the expansion starting position S was an acute angle. Regarding one welding locus, a status of formation of the joint portions 25 was observed on 30 layers on an average to 50 layers which was the total number of the joint portions, which was 60% to the total number of joint portions. A projecting portion 22 was formed between adjacent joint portions 25, and a distal end position of the projecting portion 22 was positioned nearer the current collecting disk 7 side than the expansion starting position S. The number of portions where the joint portion 26 was formed was 20 layers/50 layers on an average, which was 40% to the total number of joint portions. Regarding 10 lithium-ion secondary batteries arbitrarily selected from the lithium-ion secondary batteries 20, AC impedance measured was 2.56 mΩ.

Example 6

Figure 6B:
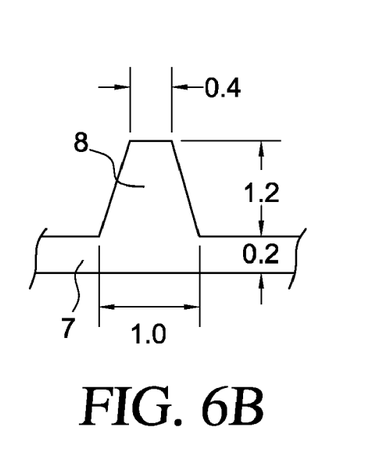

In Example 6, a current collecting disk 7 having a projecting ridge portion 8 a different size was used. That is, as shown in FIG. 6B, a width of an upper base and a width of a lower base were set to 0.4 mm and 11.0 mm relative to 0.2 mm which was a thickness of the current collecting disk 7. Since batteries were manufactured in the same manner as Example 1 except that an irradiation output at a laser welding time was 900 W at welding on the positive electrode side while that was 750 W at welding on the negative electrode side in Example 6, and internal short-circuiting symptom was observed in one of 10 batteries manufactured, the battery was disassembled and inspected. Though a joint portion was formed in a width-expansion shape, the expansion starting position S was formed inside the end edge of the separator 5 (the side opposite to the current collecting disk 7) and melt loss was observed in a portion of the separator 5. It is thought from such a fact that, since a volume of the projecting ridge portion 8 on the current collecting disk 7 was increased in Example 6, a growing-down amount of melt material due to laser beam irradiation at a welding time increased and a projecting portion 22 to be formed became large, so that the expansion starting position S of the joint portion was formed nearer the winding group 6 than the end edge of the separator 5. Therefore, It is estimated that the positive electrode plate and the negative electrode plate contacted with each other at the melt loss portion of the separator 5 which caused internal short-circuiting.

Example 7

Example 7 was similar to Example 1 except that a width of the negative electrode mixture non-application portion 3 was set 2 mm and running-over amounts of both the positive electrode mixture non-application portion 1 and the negative electrode mixture non-application portion 3 from the separator 5 at a formation time of the winding group 6 were set to 1 mm in Example 7. Since internal short-circuiting symptom was observed in one of 10 lithium-ion secondary batteries 20 manufactured, the battery was disassembled and inspected. Though a joint portion was formed in a width-expansion shape, the expansion starting position S was formed inside the end edge of the separator 5 and melt loss was observed in a portion of the separator 5. It is thought from such a fact that, since the running-over amounts of the positive electrode mixture non-application portion 1 and the negative electrode mixture non-application portion 3 from the separator 5 were reduced in Example 7, the expansion starting position S of the joint portion was formed nearer the winding group 6 than the end edge of the separator 5. Therefore, it is estimated that the positive electrode plate and the negative electrode plate contacted with each other at the melt loss portion of the separator 5 which caused internal short-circuiting.

Regarding Examples 1 to 5 of all Examples explained above, statuses of the joint portions due to change in irradiation output of laser at a laser welding time will be explained in a comparison manner. Observation results of the joint portions and measurement results of AC impedances are collectively shown in the following Table 1. Incidentally, in Table 1, a welding ratio having expansion shows a percentage of the number of joint portions 25 to the total number of joint portions (see FIG. 9), a welding ratio having no expansion shows a percentage of the number of joint portions 26 to the total number of joint portions (see FIG. 10), and an angle shows an expanding angle P at a expansion starting position S.

TABLE 1

|  | Welding Ratio (Angle) having Expansion | Welding Ratio having No Expansion | AC Impedance | Remark |
| --- | --- | --- | --- | --- |
| Example 1 | 70% (acute angle) | 30% | 2.47 mΩ |  |
| Example 2 | 80% (acute angle) | 20% | 2.07 mΩ |  |
| Example 3 | 92% (acute angle) | 8% | 2.00 mΩ |  |
| Example 4 | 76% (acute angle) | 8% | 2.38 mΩ | foil meltdown 16% |
| Example 5 | 60% (obtuse angle) | 40% | 2.56 mΩ |  |

As shown in Table 1, the joint portions 25 with a width expansion were formed in all Example 1 to Example 5, but it was found that the status of the whole joint portion was changed by changing irradiation output of laser beam. It was also found that the AC impedance lowered according to increase in a welding ratio having expansion so that battery performance was improved. Especially, it became apparent that AC impedance could be made further low in Examples 2 and 3 where the welding ratio having expansion was 80% or more. In the joint portion 26 having no expansion, it can be conjectured that a sufficient welding amount (volume) could not be obtained and electric resistance between the current collecting disk 7 and the positive electrode mixture non-application portion 1 or the negative electrode mixture non-application portion 3 did not lower. In Example 4 where irradiation output of laser beam was increased, it is thought that, since irradiation energy was excessively intense, meltdown of the positive electrode mixture non-application portion 1 or the negative electrode mixture non-application portion 3 occurred so that the welding ratio having expansion was not increased. On the contrary, in Example 5 where irradiation energy was insufficient, the joint portion was formed an approximately conical shape, but a joint portion 27 where an expansion angle P at an expansion starting position S was an obtuse angle was formed and the welding ratio having expansion was insufficient.

Accordingly, by adjusting a size of the projecting ridge portion 8 to be formed on the current collecting disk 7 and irradiation output at a laser welding time, it has been found that a ratio of formation of the joint portion 25 can be increased, so that AC impedance can be decreased. Since such a lithium-ion secondary battery 20 is reduced in internal resistance, it can be suitably used in application with a high-rate orientation for power source for an electric power tool or a hybrid vehicle where a large amount of current is charged and discharged, or the like.

(Operation and the Like)

An operation of the lithium-ion secondary battery 20 according to the embodiment and the like will be explained.

In the embodiment, the current collecting disks 7 are disposed on both end faces of the winding group 6 so as to face the both end portions, and the end portion of the positive electrode mixture non-application portion 1 and the end portion of the negative electrode mixture non-application portion 3 are joined to faces of the current collecting disks 7 on the winding group 6 side at a plurality of joint portions 25 by laser welding. Some joint portions of the joint portions form joint portions 25 taking on a width expansion shape gradually expanding toward the current collecting disk 7. Since a plurality of joint portions is formed, the number of current collecting paths is increased, so that internal resistance can be suppressed to a small value. In the embodiment, by setting a percentage of the number of the joint portions 25 taking on a width expansion shape to the total number of joint portions to 80% or more, a volume of the joint portion can be increased so that AC impedance can be reduced (see Example 2 an Example 3). In the embodiment, since the joint portion 25 is formed to have an acute angle, namely, the expansion angle P at the expansion starting position S has an acute angle, an increase amount of volume can be increased as compared with a case that the expansion angle P is obtuse. Therefore, the internal resistance can be further suppressed (see FIGS. 9 and 11).

In the embodiment, the radial projecting ridge portions 8 are formed on the current collecting disk 7, and the end portion of the positive electrode mixture non-application portion 1 (the end portion of the negative electrode mixture non-application portion 3) is joined to the current collecting disk 7 by irradiation of laser beam to the projecting ridge portions 8. Therefore, the joint portions are linearly arranged on the face of the current collecting disk 7 positioned on the side of the winding group 6. Since the joint portions are formed by conducting irradiation of laser beam linearly in a scanning manner, joining can be achieved easily. In the embodiment, a projecting portion 22 is formed on the face of the current collecting disk 7 positioned on the side of the winding group 6 between adjacent joint portions of the joint portions formed linearly. The distal end of the projecting portion 22 is positioned nearer the current collecting disk 7 side than the expansion starting position S of the joint portion 25. The projecting portion 22 is formed by growing-down of the projecting ridge portion 8 and a portion of the current collecting disk 7 melted at a laser welding time toward the winding group 6, but since the distal end of the projecting portion 22 is positioned nearer the current collecting disk 7 side than the expansion starting position S of the joint portion 25, the melted portion further grows down along the positive electrode mixture non-application portion 1 or the negative electrode mixture non-application portion 3 so that formation of the approximately conical joint portion 25 is further facilitated.

In the embodiment, the expansion starting position S of the joint portion 25 is positioned nearer the current collecting disk 7 than the position of the end edge of the separator 5. Therefore, since a melted portion of the joint portion 25 or the projecting portion 22 does not contact with the separator 5 at a laser welding time, heat generated by laser welding is hard to reach the separator 5, so that melting damage of the separator 5 can be prevented.

In the embodiment, the positive electrode mixture non-application portion 1 and the negative electrode mixture non-application portion 3 are joined to faces of the current collecting disks 7 on the positive electrode side and the negative electrode side positioned on the side of the winding group 6. Therefore, as compared with a case of working current collectors configuring the positive electrode plate and the negative electrode plate to strip comb shapes or attaching current collecting tabs to current collectors, time for working or attaching is made unnecessary, so that manufacturing efficiency can be improved. As compared with a case of winding a positive electrode plate and a negative electrode plate which are worked to strip comb shapes or are attached with current collecting tabs, the positive electrode plate, the negative electrode plate, and the separator are prevented from being wound in a state that current collecting tabs have been bitten into the positive electrode plate, the negative electrode plate, or the separator at a manufacturing time of the winding group 6, so that a possibility of such a step trouble that insulation between the positive electrode and the negative electrode is impaired can be completely eliminated. Further, current collecting tabs or the like are gathered so as to cover the end face of the winding group and joined to a side edge of the current collecting disk. In the embodiment, however, since the positive electrode mixture non-application portion 1 and the negative electrode mixture non-application portion 3 do not cover the end face of the winding group 6 and the slits 9 are formed in the current collecting disk 7, flow paths of nonacqueous electrolyte to the winding group 6 can be secured. Thereby, a time required for nonacqueous electrolyte to flow in the winding group 6 can be reduced and such a factor as leading to increase of preparing lead time can be completely eliminated. Accordingly, since the abovementioned joint portions are formed, AC impedance can be reduced and a possibility of causing internal short-circuiting or voltage lowering can be eliminated, so that a lithium-ion secondary battery with high performance and high reliability can be provided.

Incidentally, in the embodiment, the winding group 6 formed by winding the positive electrode plate and the negative electrode plate has been shown as the electrode body, but the present invention is not limited to such a winding group, and the winding group can be configured as a laminated electrode group obtained by laminating a positive electrode plate and a negative electrode group which have such a shape as a rectangular shape or a circular shape via a separator. In the embodiment, an example where the current collecting disks 7 are disposed on both the positive electrode side and the negative electrode side has been shown, but the present invention is not limited to this example. For example, an end portion of the negative electrode mixture non-application portion 3 can be directly joined to an inner bottom face of the battery container 10 by laser welding without disposing the current collecting disk 7 on the negative electrode side. Such a configuration can be realized, for example, by using the same material as the negative electrode current collector for the battery container 10. In this embodiment, the example where the battery container 10 also serves as the negative electrode external terminal and the upper lid 11 also serves as the positive electrode external terminal has been shown, but the present invention is not limited to the example and the battery container 10 is utilized as the positive electrode external terminal while the upper lid 11 is utilized as the positive electrode external terminal.

In the embodiment, the example where the radial projecting ridge portions 8 are formed on the current collecting disk 7 has been shown, but the present invention is not limited to the example and, for example, a plurality of projecting ridge portions may be formed in a curved manner such as an involute curve. The number of projecting ridge portions 8 is not limited to four, but it may be three or six. Further, it is not required that all the radial projecting ridge portions 8 are formed to extend from a central portion toward a peripheral edge portion. For example, some of these projecting ridge portions may be formed so as to extend from an intermediate position in the radial direction to the peripheral edge portion.

In the embodiment, the example where the current collecting disk 7 is used as the current collecting member has been shown, but the present invention is not limited to the example and only formation of the projecting ridge portions 8 applied for laser welding is required. For example, when the laminated electrode group is used, the current collecting member with a rectangular shape may be used and the shape of the current collecting member is not limited to a specific one. In the embodiment, the joint portion 25 formed by laser welding takes on a width-expansion shape. Since a melted portion grows down due to gravity due to irradiation of laser beam to the projecting ridge portion 8 on the current collecting disk 7 from above the current collecting disk 7 so that the joint portion 25 is formed, the joint portion 25 is generally formed in an approximately conical shape. For example, when the current collecting disk 7 is tilted during laser welding, a sectional shape of the joint portion 25 becomes an asymmetric width expansion shape. Accordingly, in the present invention, the joint portion is simply required to be formed in a width expansion shape and it is not required to be symmetrical.

In the embodiment, the example where the positive electrode plate 2 and the negative electrode plate 4 are configured by applying positive electrode mixture and negative electrode mixture to both faces of an aluminum foil and both faces of a rolled copper foil has been shown, but the present invention is not limited to the example. For example, regarding portions of the positive electrode mixture application face and the negative electrode mixture application face which do not face each other in the winding group 6, an application portion may be partially formed on only one face of the aluminum foil or the rolled copper foil. The shape or size of the battery is not limited to specific one, of course.

INDUSTRIAL APPLICABILITY

Since the present invention provides a lithium-ion secondary battery with reduced internal resistance, it contributes to manufacture and sales of a lithium-ion secondary battery, so that the present invention has an industrial applicability.

What is claimed is:
1. A lithium-ion secondary battery provided with an electrode body where a positive electrode plate obtained by applying positive electrode mixture mainly including positive electrode active material to a current collector and a negative electrode plate obtained by applying negative electrode mixture mainly including negative electrode active material to a current collector are disposed so as to sandwich a separator, wherein at least one of the current collectors of the positive electrode plate and the negative electrode plate is disposed such that an end portion of said at least one of the current collectors of the positive electrode plate and the negative electrode plate projects from an end face of the electrode body, an end portion of each current collector is joined to a face of a current collecting disk positioned on the side of the electrode body at a plurality of joining portions, each joining portion being arranged along a straight line on the face of the current collecting disk and being individually protruded from the face of the current collecting disk, the current collecting disk being made from the same material as the current collector and being disposed so as to face the end face of the electrode body, and at least some of the joining portions which form a plurality of joint portions, in a section along a direction of the straight line shapes, have a width-expanded shape gradually expanding in thickness from a joint end portion with a non-application portion of the electrode mixture on the current collector toward the current collecting disk.

2. The lithium-ion secondary battery according to claim 1, wherein the number of the joint portions having the width-expanded shape to the total number of the joining portions is 80% or more.

3. The lithium-ion secondary battery according to claim 1, wherein the current collecting disk has a projecting portion on a face thereof positioned on the electrode body side between adjacent joining portions of the arranged joining portions.

4. The lithium-ion secondary battery according to claim 3, wherein a distal end of the projecting portion is positioned nearer the current collecting member disk than an expansion starting position of the joint portion having the width-expanded shape.

5. The lithium-ion secondary battery according to claim 4, wherein the expansion starting position of the joint portion having the width-expanded shape is positioned nearer the current collecting disk side than a position of an end edge of the separator.

6. The lithium-ion secondary battery according to claim 4, wherein a joint end portion of the joint portion having the width-expanded shape with the current collector is formed to have an in the shape of an acute angle.

7. The lithium-ion secondary battery according to claim 1, wherein a current collector whose end portion projects from the end face of the electrode body is formed on one side edge thereof with a non-application portion of the positive electrode mixture or the negative electrode mixture.

8. The lithium-ion secondary battery according to claim 7, wherein at least one portion of the non-application portion projects from the end edge of the separator and a projecting end portion of the non-application portion projects from the end face of the electrode body.

* * * * *